May 11, 1965     E. A. NEYDLI     3,183,406
TRANSFORMER CASE
Filed Nov. 19, 1962
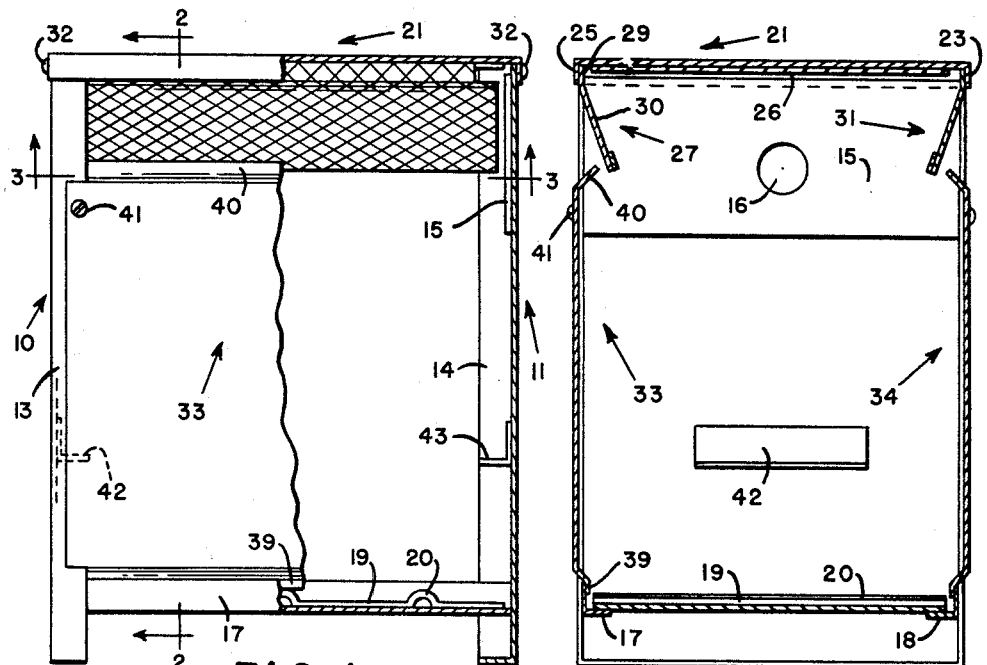
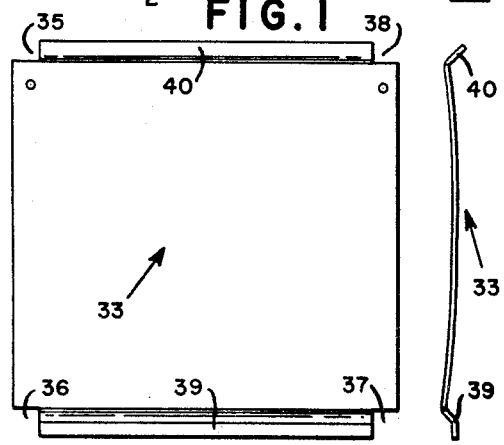
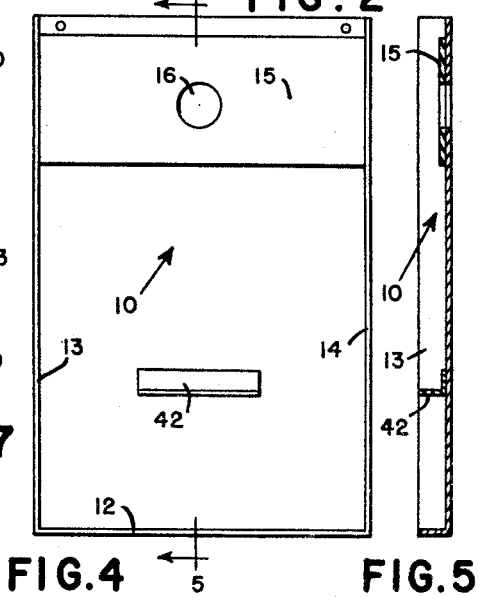
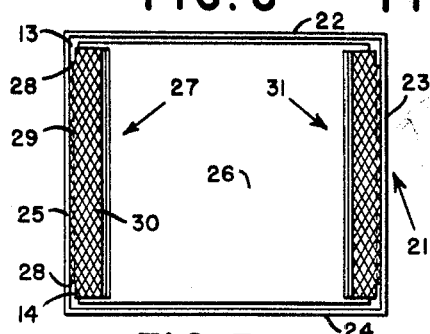
INVENTOR.
EDWARD A. NEYDLI
BY Robertson & Smythe
ATTORNEYS United States Patent Office 3,183,406
Patented May 11, 1965

3,183,406
TRANSFORMER CASE
Edward A. Neydli, Watertown, Wis., assignor to Basic Products Corporation, Milwaukee, Wis., a corporation of Wisconsin
Filed Nov. 19, 1962, Ser. No. 238,485
3 Claims. (Cl. 317—99)

The present invention relates to enclosures and particularly to an improved enclosure for a transformer or the like.

One of the problems in enclosures for transformers and the like is to provide a removable panel which will fit tightly around all edges. This has been difficult to obtain in past arrangements using flat structural elements.

The principal object of the invention is to provide an enclosure for a transformer or other electrical equipment having readily removable panel means partially held in proper position by resilient means.

Another object of the invention is to provide such an enclosure that includes ventilating means for the transformer or other electrical equipment contained therein.

Still another object of the invention is to provide such an enclosure in which hum of the transformer will not cause vibrations of the removable enclosure panel means.

In one aspect of the invention, an enclosure embodying the principles of the invention may comprise opposed, rectangular end panels of sheet metal having flange means formed along three edges thereof, i.e., along the two longitudinal edges and along one of the transverse edges, the latter forming the base edge of the panels. These two opposed panels may be connected by angle members spaced above the bottom transverse flanged edges thereof.

In another aspect of the invention, a bottom plate having reinforcing beads thereon may be welded or otherwise rigidly fixed to the angle members connecting the end panels.

In still another aspect of the invention, a reinforcing sheet may be rigidly attached to the inner side of each of the end panels, may extend from one of the flanges to the other of each end panel member, and may be located slightly below the top, non-flanged edge of each panel member.

In still another aspect of the invention, a top cover may be provided for rigidly connecting top edges of the end panels together and it may include a sheet metal element having flanges along all four edges thereof. Within the confines of said flanges, a sheet of heat insulating duct lining material may be cemented or otherwise attached to the cover.

In still another aspect of the invention, inwardly directed, depending grids of expanded metal or the like may be welded or otherwise attached to two opposed flanges of the cover. When the cover is attached to the opposed panel members, the grids of expanded metal are adapted to extend between the flanges on the two panel members that lie in a common plane.

In a still further aspect of the invention, panels may be removably connected by screws or the like to the flanges on the two panel members that lie in a common plane. Each removable panel may be notched at its four corners and may include an offset lip at the lower end and an inwardly directed flange at the upper end. Each removable panel may be bowed inwardly from its offset lip at the bottom to the inwardly directed flange at its top. The construction is such that when the bottom lip is inserted along the inside of the angle connecting the end panel members, and the upper end of said bowed panel is bolted or otherwise fastened to the flanges on the end panel members, the bowed panel is forced into a straight plane, providing resilient means along the flanges of said end panel members for preventing vibration thereof.

In still another aspect of the invention, other angles may be fixed to the end panel members within the enclosure for supporting the transformer or other electrical equipment, and a hole to receive lifting devices may be provided within said end panel members.

The above, other objects and novel features of the invention will become apparent from the specification and accompanying drawing which is merely exemplary.

In the drawing:

FIG. 1 is an elevational view, partly broken away, to disclose certain features of an enclosure to which the principles of the invention have been applied;

FIG. 2 is a sectional elevational view taken substantially along line 2—2 of FIG. 1;

FIG. 3 is a view of the cover as it appears when removed from the enclosure, looking in the direction of the arrows along line 3—3 of FIG. 1;

FIG. 4 is a plan view of an end panel of the enclosure;

FIG. 5 is an end view of the panel shown in FIG. 4;

FIG. 6 is a plan view of a bowed removable panel forming an element of the invention; and FIG. 7 is an end view of the bowed panel of FIG. 6.

Referring to the drawings, and particularly to FIGS. 1, 2, 4 and 5, the principles of the invention are shown as applied to an enclosure including two opposed end panels 10 and 11. Referring to FIGS. 4 and 5, each panel 10, 11 may be made from sheet metal and may include flanges 12, 13 and 14 along three edges thereof. A reinforcing plate 15, which may be made from insulating material, may be integrally attached to the panels 10 and 11 and may extend between the flanges 13 and 14. A hole 16 may be provided in one of the panel members 10, 11 for receiving lifting hooks or the like.

Referring to FIGS. 1 and 2, the end panel members 10 and 11 may be connected by angle members 17 and 18 near the lower end thereof, and a base plate 19, having reinforcing beads 20 thereon, may be welded or otherwise rigidly attached to the angle members 17, 18. Base plate 19, if desired, may be a screen (not shown).

The upper ends of the panel members 10 and 11 may be held in properly spaced relation by a cover 21. Referring to FIG. 3, the cover 21 may be made of sheet metal and may include flanges 22, 23, 24 and 25 surrounding it. A sheet 26 of insulating material, such as duct liner material, may be cemented or otherwise secured to it within the area defined by flanges 22–25 and spaced therefrom. A screen grid 27 may be made from expanded metal or the like, may be notched at 28 and may be bent to provide a flange 29 and a skirt portion 30. The flange 29 may be welded or otherwise fastened to the flange 25 such that the skirt portion 30 extends inwardly and away from the sheet 26 that is attached to the top of the cover 21. A similar screen grid 31 may be attached to the flange 23.

When the cover 21 is applied to the upper ends of the end panel members 10 and 11, the grids 27 and 31 overlap the flanges 13 and 14 as shown in FIG. 1, the notches 28 providing recesses for the uppermost ends of flanges 13 and 14 of panels 10 and 11. Screws 32, or other means, may be employed to fasten cover 21 to the end panel members 10 and 11.

Panels 33 and 34 may be removably applied to the opposed openings formed by the end panels 10 and 11. Referring to FIGS. 6 and 7, panel 33 may comprise a sheet metal member having notches 35, 36, 37 and 38 formed at its four corners. The lower edge of the panel 33 may include an offset lip 39, while the top edge may include an inwardly inclined flange 40. The portion of panel 33 between lip 39 and flange 40 may be bowed inwardly in the direction of the inclination of the flange 40.

The offset lip may fit inside of, and along the upstanding portion of angle 17, while the sides of the panel 33 overlap the flanges 13 and 14 of the end panel members 10 and 11. Accordingly, forcing the panel 33 into a straight plane causes the overlapping edges thereof to contact all along the flanges 13 and 14, and screws 41 may be employed to hold the panel 33 in place. The bowed panel 33 in its straightened condition provides a resiliently acting force preventing its vibration. The panel 34 is identical with panel 33 and further description of it is believed unnecessary.

Referring again to FIGS. 1 and 2, angle members 42 and 43 may be attached to the panels 10 and 11 for supporting a transformer or other electrical equipment.

Although the various features of the improved enclosure have been shown and described in detail to fully disclose one embodiment of the invention, it will be evident that changes may be made in such details and certain features may be used without others without departing from the principles of the invention.

What is claimed is:

1. An enclosure for housing a transformer or the like comprising in combination, oppositely facing end panel members joined together in spaced relation by angle means near one end thereof; a bottom plate fixed to said angle means; a cover attached to the opposite ends of said end panel members, said cover including inwardly directed grid means along at least one side thereof and between said end sheet panel members; bowed panel means removably attached to said end panel members, said bowed panel means overlapping the edges of said end panel members; and means for fixing the top and bottom of said bowed panel means to said end panel members such that cooperation between the edges of said end panel members and said bowed panel means forces said bowed panel means into a single plane to provide a resiliently acting force preventing vibration of said front and rear panels.

2. An enclosure for housing a transformer or the like comprising in combination, oppositely facing end panel members joined together in spaced relation by angle means near one end thereof; a bottom plate fixed to said angle means; a cover attached to the opposite ends of said end panel members; inwardly bowed front and rear sheet panels removably attached to said end panel members, each of said bowed front and rear panels overlapping the edges of said end panel members and having a bottom offset lip portion adapted to engage said angle means; and means for fixing the top of said bowed panels to said end panel members such that cooperation between the edges of said end panel members and said bowed panels forces said bowed panels into a single plane to provide a resiliently acting force preventing vibration of said front and rear panels.

3. An enclosure for housing a transformer or the like comprising in combination, oppositely facing end panel members joined together in spaced relation by angle means near one end thereof; a bottom plate fixed to said angle means; a cover attached to the opposite ends of said end panel members, said cover including inwardly directed grid means along opposite sides thereof and between said end panel members; inwardly bowed front and rear sheet panels removably attached to said end panel members, each of said bowed front and rear panels overlapping the edges of said end panel members and having a bottom sheet offset lip portion adapted to engage behind said angle means, and a top inwardly inclined portion projecting towards said grid means; and means for fixing the top of said bowed panels to said end panel members such that cooperation between the edges of said end panel members and said bowed panels forces said bowed panels into a single plane to provide a resiliently acting force preventing vibration of said front and rear panels.

References Cited by the Examiner

UNITED STATES PATENTS

| | | | |
|---|---|---|---|
| 2,171,643 | 9/39 | Brenkert | 317—100 |
| 2,765,362 | 10/56 | Lindgreen | 174—35 |

JOHN F. BURNS, *Primary Examiner.*

E. JAMES SAX, *Examiner.*